UNITED STATES PATENT OFFICE 2,307,650

SULPHANILAMIDO-AMINO-PYRIDINES AND PROCESSES FOR PRODUCING THE SAME

Edmond T. Tisza and Bernard F. Duesel, Yonkers, N. Y., assignors to Nepera Chemical Company, Inc., Nepera Park, N. Y., a corporation of New York No Drawing. Application November 29, 1938, Serial No. 242,892

7 Claims. (Cl. 260—295)

Our invention relates to new substitution compounds of pyridine and refers particularly to pyridine compounds having valuable therapeutic properties.

It is known that azo dyes prepared from diamino-pyridines are very important as urinary antiseptics, and, further, sulphanilamide is also known as an important therapeutic agent. We have found that diamino-pyridines may be condensed with p-amino-benzene-sulphonamide to form new substances, which are valuable as therapeutic agents, and that they form starting materials for the production of other valuable compounds as, for instance, they may be coupled with diazotized and tetrazotized amines of the aromatic series.

The general formula of these compounds is:

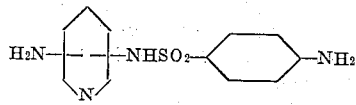

From among the various methods by which the products of our invention may be produced, we give the following examples:

Example 1

12 grams p-acetaminobenzene-sulphonylchloride, purified by recrystallization out of benzene, are dissolved in 300 cc. chloroform previously dried over calcium chloride. 7.4 grams 2-amino-6-acetaminopyridine are added in small portions during a period of three hours, while the mixture is being gently refluxed. The refluxing is continued for three additional hours, during which period of gray incrustation settles out on the sides of the flask. The solvent is now decanted and the residue is freed from chloroform by means of a suction pump. The dry residue is dissolved in 100 cc. boiling ethanol. The unchanged 2-amino-6-acetaminopyridine hydrochloride remains undissolved. The ethanol solution is treated with charcoal and concentrated for crystallization. The collected crystals, 2-acetsulphanilamido-6-acetaminopyridine, form white needles. M. P. 230° C. They are soluble in alcohol, slightly soluble in hot water and dilute acids, more soluble in dilute alkalies, and insoluble in chloroform. To obtain the free base, the alcohol solution is evaporated to dryness, the residue is boiled in 400 cc. dilute (10%) HCl for 20 minutes. The compound dissolves readily on heating. After cooling, sodium carbonate is added until the mixture becomes faintly alkaline. After standing two hours, the precipitate is collected, dissolved in 300 cc. boiling water, treated with charcoal, filtered, and crystallized.

The chemical reaction of the process is the following:

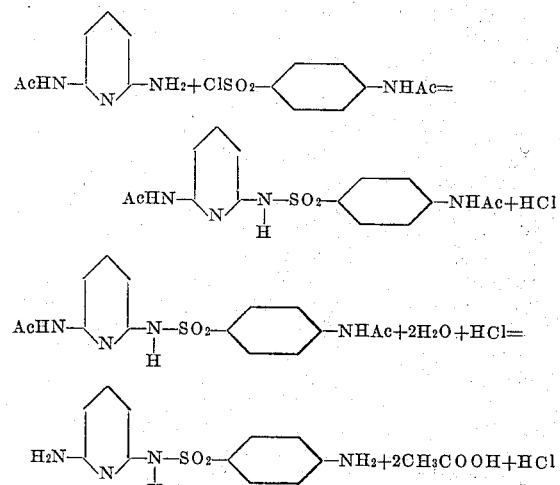

The 2-sulphanilamido-6-aminopyridine thus prepared forms fine white needles, which melt at 204-5° C. It is soluble in hot water, alcohol, dilute alkalies, slightly soluble in dilute acids, acetone, and ethyl acetate. It is insoluble in chloroform, ether, benzene, and ligroine. The foregoing formula was confirmed by analysis. In a nitrogen determination (micro-Dumas) there was found N=21.16%. Theoretical N=21.12%.

We give the following as an example of the therapeutic properties of the compound thus produced:

2-sulphanilamido-6-aminopyridine was tested for therapeutic action the usual way. 20 mice were infected with hemolytic streptococci intraperitoneally. 10 of these mice were treated with the compound and 10 were untreated for controls. Of the treated animals, 8 survived while all the controls died. This is an 80% efficiency.

Example 2

2.4 grams p-acetaminobenzene-sulphonylchloride are dissolved in 50 cc. dry chloroform. 1.5 grams 2-acetamino-5-aminopyridine are added in small portions during a period of two hours while the mixture is gently refluxed. The refluxing is continued for four additional hours, during which time first a complete solution is obtained and afterward a precipitation occurs. The collected precipitate is freed from chloroform in vacuo, This precipitate, 2-acetamino-5-acetsulphanilamidopyridine, forms white needles, when recrystallized from hot water. It does not melt when heated to 280° C. To obtain the free base, the substance is boiled in dilute (12%) HCl for 20 minutes. The compound dissolves on heating. After cooling to room temperature, sodium carbonate is added until the mixture becomes faintly alkaline. The precipitate is collected, washed with cold water, and recrystallized from boiling water.

As 2-acetamino-5-aminopyridine was used in this experiment, the condensation must take place on the 5-amino group.

The 2-amino-5-sulphanilamido pyridine thus prepared forms white, slender prisms, which melt at 211-2° C. It is soluble in hot water, dilute alkalies, and dilute acids. It is soluble in hot alcohol, acetone, very slightly soluble in ethyl acetate, and insoluble in benzene, ether, carbon tetrachloride, and ligroine. It possesses therapeutic properties.

The condensation may take place on either the alpha, beta, or gamma amino group by the indicated protective acetylation of the other amino group of the amino-acetaminopyridine.

*Example 3*

4.8 grams p-acetamino-benzene-sulphonylchloride are mixed and pulverized in a mortar with 2.8 grams 2-amino-6-acetaminopyridine. The mixture is placed into a test tube and heated in an oil bath. At 60–80° C. it begins to soften and at 120° C. it is fairly fluid. The temperature is raised and kept at 130–140° C. for one hour while the melt is stirred continuously. After cooling, the mixture forms a pale brown brittle solid. This is suspended in 25 cc. of dilute (15%) HCl and refluxed for half an hour. Sufficient water is added to make a complete solution; then sodium bicarbonate is added until a faintly alkaline reaction is produced. The precipitate is collected and recrystallized from warm water after treating with charcoal.

Diaminopyridine bases may be condensed directly with p-acetamino-benzene-sulphonylchloride. The yield, however, is not quite as satisfactory as by using the methods of Examples 1 and 2. Besides, as already mentioned, by acylating one of the amino groups, the position of the condensation can be selected. It is self-evident, that homologues of diaminopyridines, for instance diaminopicolines, react the same way, to form similar compounds.

The above-described sulphamido-amidopyridines may be coupled with diazotized aromatic amines to form azo dyes. For instance, diazotized aniline couples with 2-sulphanilamido-6-aminopyridine in alkaline medium to form the following dye:

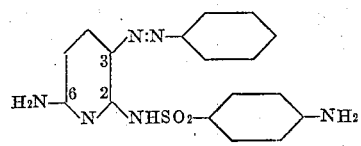

The coupulation is expected to take place in para position to the free amino group.

This dye, 2-sulphanilamido-3 benzene-azo-6 amino pyridine, forms orange red needles from alcohol. M. P. 230-2° C. It is slightly soluble in hot water and dilute acids. It is soluble in dilute alkalies with a deep red color. It is soluble in alcohol, chloroform, acetone, ethylacetate, benzene, and ether.

An azo dye may be made from these sulphamido pyridines which contain a second sulphanilamide group. By diazotizing p-amino-benzene-sulphonamide the customary way, it will couple with 2-sulphanilamido-6-aminopyridine in alkaline medium to form the following dye:

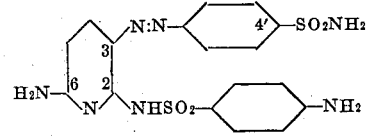

This dye, 2-sulphanilamido-3(4' sulphanamido) benzenago-6-amino pyridine, crystallizes in golden yellow needles from alcohol. M. P. 264–5° C. It is slightly soluble in hot water and dilute acids. In dilute alkalies it is soluble with a deep red color. It is soluble in organic solvents but not quite as easily as the previously described dye.

It is obvious that many other azo dyes and other compounds may be prepared from the intermediates disclosed in the foregoing specification without departing from the invention or sacrificing the advantages thereof; therefore, we do not intend to limit ourselves to the specific embodiment herein set forth except as indicated in the appended claims.

What we claim is:

1. The method of producing sulphanilamidoaminopyridines comprising reacting an amino-acetaminopyridine with p-acetamino-benzene-sulphonylchloride, hydrolysing off the acetyl groups with dilute acid, precipitating the free base with an alkali, and purifying the compound thus produced.

2. A method of producing sulphanilamidoamino-pyridine comprising reacting 2-amino-6-acetaminopyridine with p-acetaminobenzene-sulphonylchloride, hydrolysing off the acetyl groups with dilute acid, precipitating the free base with an alkali, and purifying the compound thus produced.

3. As new chemical compounds, sulphanilamido-aminopyridines of the general formula

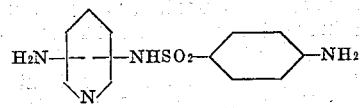

and N-acyl derivatives thereof.

4. As a new chemical compound, 2-sulphanilamido-6-amino pyridine.

5. As new chemical compounds, the 2-sulphanilamido 6 amino pyridine and N-acyl derivatives thereof.

6. The compound of the formula:

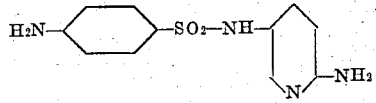

7. The compounds, acetsulphanilamido acetamino-pyridines.

EDMOND T. TISZA.
BERNARD F. DUESEL.